INVENTORS
EDWIN I. STEARNS, JR.
GEORGE L. BUC,
BY Robert Ames Norton
ATTORNEY

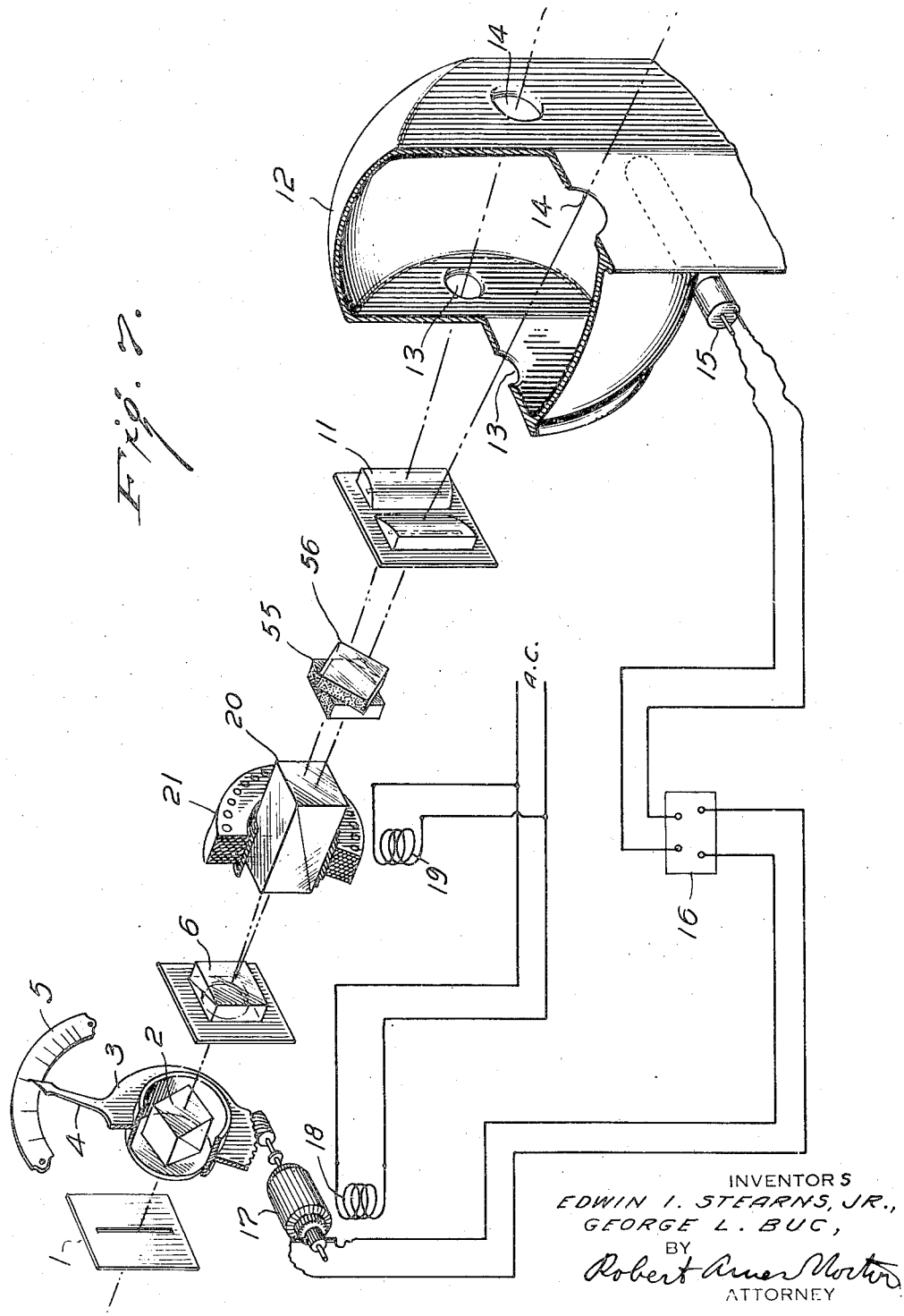

Patented May 24, 1949

2,471,249

UNITED STATES PATENT OFFICE 2,471,249

PHOTOMETRIC APPARATUS AND SPECTRO-PHOTOMETER USING POLARIZED LIGHT AND A MULTIPLE RETARDATION PLATE

Edwin I. Stearns, Jr., North Plainfield, and George L. Buc, Orange, N. J., assignors to American Cyanamid Company, New York, N. Y., a corporation of Maine Application December 27, 1944, Serial No. 569,946

20 Claims. (Cl. 88—14)

This invention relates to improved photometric devices involving polarizing elements.

A number of photometric devices have been developed and some of them involve polarizing elements. In some cases the polarization is incidental and performs no useful function. Thus, for example, monochromating devices produce varying degrees of polarization at different wave lengths in the visible, ultra violet and infrared portions of the spectrum. The polarizing may be due to reflection from mirrors or other elements incidental to the photometric apparatus. In most cases the polarization performs no useful function but is unavoidable. Examples of such devices are ordinary photometric spectrophotometers, spectrographs and the like.

Another type of photometric apparatus in which polarization may enter is comparison colorimeters using split comparison fields. An example of such is a Duboscq colorimeter in which polarization results from the mirrors in the instrument. In general any photometer which uses a mirror will introduce various degrees of polarization.

Some photometric instruments and spectrophotometers use polarization deliberately to effect photometering. A simple instrument of such a type is a Martens photometer in which light beams from a sample and standard pass through a Wollaston prism which polarizes them at right angles. Polarizers such as a Nicol or a Rochon prism effect photometering. This type of device is also used in the Koenig-Martens spectrophotometer.

In more recent years polarized flickering beam spectrophotometers have achieved great success and their speed and precision account for their predominant position.

All of these types of apparatus possess a common characteristic, namely, the optical system includes a sample illuminating means and photometering means in which at least one element polarizes light partially or wholly. All of these instruments give different readings when a polarizing sample is present depending on the orientation of the sample, that is to say, its azimuth with respect to the optical axis of the polarizing elements of the instrument. This variance is known as the azimuth effect and introduces a serious error even in the most highly developed spectrophotometers of the polarized flickering beam type. The first successful commercial machine of this type is described in the patent to Orrin Weston Pineo, No. 2,107,836, February 8, 1938. In this spectrophotometer, light from a Van Cittert double monochromator passes through a photometering Rochon prism, then through a Wollaston prism and finally through a Rochon prism which is rotated at an accurately predetermined rate by means of a synchronous motor. The two beams from the Wollaston prism which are polarized at right angles to each other after passing through the rotating Rochon strike samples and standards of either reflectance or transmission and the total light from the two beams is integrated in an integrating sphere and the integrated light impressed on a phototube which is in the input circuit of a very high gain audio frequency amplifier. The amplified output is then impressed on the armature of a motor, the field of which is supplied with the same current used in driving the synchronous motor and which drives the photometering Rochon prism in a direction which will result in a change in intensities of the flickering beams to cause the intensities of the beams in the integrating sphere to be equal, at which time there is present in the integrating sphere no light fluctuation at flicker frequency and hence no amplified signal at flicker frequency. The photometering motor may drive an indicating device for an automatic recorder of known design.

The polarized flickering beam spectrophotometer has achieved great success because in its most elaborate modifications curves of photometric absorption or reflectance can be automatically drawn in a very short time. Great as is the advance represented by the polarized flickering beam spectrophotometer over early instruments, in its original form the device had some disadvantages. In that form, the light incident on the specimen is varying its plane of polarization, so that in many cases an unknown factor of variation is introduced which may vitiate the results. Further, spurious signals of the fundamental and harmonic frequencies are produced in the photo-cell circuit which obscure the vanishing signal at balance and so result in loss of sensitivity in detecting the balance point.

In the patent of O. W. Pineo, No. 2,126,410, August 9, 1938, there are described a number of different flickering means which when followed by a stationary polarizer, such as, for example, a Rochon prism, produced reliable flickering with beams which maintain a constant plane of polarization instead of a plane which rotates with rotation of the flicker prism as in the early Pineo patent referred to above. These means include a rotating retardation plate, such as a half-way plate, Kerr cells impressed with alternating voltage at flicker frequency or magnetostrictive devices. In the improved instrument which is described in the two Pineo patents the reduced sensitivity with polarizing samples is completely overcome and for the first time it becomes possible to obtain reliable and accurate spectrophotometric measurements of polarizing samples. The great advance in sensitivity and accuracy with polarizing samples, however, obtained only if the orientation of the sample was constant and hence the azimuth of polarization did not change. Conflicting results were obtained if the same sample was measured at different azimuths.

In the patent of O. W. Pineo, No. 2,189,270, February 6, 1940, there is described an improvement on the instrument using a stationary plane of polarization in which the final Rochon prism is followed either by a quarter wave plate or a Fresnel rhomb. Both of these devices transfer plane polarized light into circularly polarized light which is not sensitive to change in azimuth of the sample. The improvement described in the last mentioned Pineo patent, while of definite practical value, was not a complete solution of the azimuth problem because unfortunately a quarter wave plate gives a retardation of exactly a quarter of a wave length at only one frequency of light. Light of other frequencies within the visible spectrum is not circularly polarized but is elliptically polarized with ellipses of increasing eccentricity as the frequency of the light varies from that at which the quarter wave plate gives a true retardation of a quarter of a wave length. The elliptically polarized light at other frequencies materially reduces the azimuth effect as compared with plane polarized light but is still not perfect.

The Fresnel rhomb is less sharply selective with respect to wave length and from this standpoint gives a greater degree of azimuth correction. However, as described in the patent, it requires an offset in the light path and presents some mechanical disadvantages as compared to a quarter wave plate.

A somewhat different form of polarizing flickering beam spectrophotometer is one in which the integrating sphere is replaced by a lens which brings together the two divergent beams onto a phototube or other photoelectric device. In order to avoid critical adjustment the image on the photoelectric means may be thrown slightly out of focus or the beams may be focussed on a ground glass or similar diffuser so that the photoelectric means is illuminated by diffuse combined light. In the simple photometric apparatus and the Pineo spectrophotometer the azimuth problem is the same.

According to the present invention the azimuth effect is eliminated by interposing between the sample and/or standard and the nearest polarizing element a relatively thick multiple retardation plate of bi-refringent material cut parallel to its optical axis.

When a portion of the spectrum of finite width such as is transmitted through the exit slit of an ordinary monochromater encounters a retardation plate after it has been plane polarized, the effect of the retardation plate, the axis of which is at 45° to the plane of polarization, changes the nature and orientation of the polarized light depending on the thickness of the plate and its material. For example, if the plate is a quarter wave plate for light at one end of the spectral band, light of this wave length will emerge as circularly polarized light, while light of somewhat shorter wave length is elliptically polarized with varying eccentricity and orientation of the axes of the ellipses until a wave length of light is reached for which the plate is a half wave plate. For this wave length the light will be plane polarized but at right angles to the original plane of polarization while shorter wave lengths will give elliptically polarized light with the orientation of the ellipses gradually changing until a wave length is reached at which the plate represents a three-quarter wave plate at which wave length the light is again circularly polarized. If a quarter wave plate of one wave length is chosen, that is to say, a relatively very thin retardation plate, the spectral band of light in which the polarization cycles from circularly polarized light back again to circularly polarized light is quite wide, much wider than the normal band emitted from the exit slit of the monochromator. When, however, the retardation plate is much thicker, the difference in wave length for a complete cycle becomes very much less and by choosing a sufficiently thick plate, a large number of cycles from circularly polarized light back to circularly polarized light will be represented in the band width from an ordinary monochromator slit, for example, a band width of about 10 millimicrons. Since the orientation and eccentricity of the elliptically polarized light of intermediate portions of the cycle change continuously the whole cycle represents a series which cancel out in effect all orientation, plane polarized light being balanced by the plane polarized light at right angles thereto and each elliptical state being balanced by a corresponding elliptical state oriented at 90° thereto. If there is a sufficient number of cycles in a 10 millimicron band, the response to a polarizing sample is averaged out and integrated light in the integrating sphere will be the same for polarizing samples arranged in different azimuths.

While the present invention is not concerned with a retardation plate of any particular material it is convenient to choose a material which has sufficiently high retardation so that a multiple retardation plate can be produced of comparatively small thickness which is convenient and compact. For this purpose calcite is well suited as a sufficiently thick plate to give complete compensation over a 10 millimicron spectral band need only be about 2 millimeters thick. This plate provides a retardation from slightly over 5 cycles in the near infrared to about 30 retardation cycles in the far violet end of the spectrum. The calcite, of course, must be cut parallel to its optical axis.

The axis of the calcite crystal should preferably be at 45° to plane of polarization introduced by the polarizing element nearest the sample in order to effect compensation. This, however, is not essential as exact orientation is not highly critical.

The elements which effect multiple retardation must be located between the sample and the nearest element in the device which introduces polarization because the desired effect is to cancel out asymmetrical polarization by the sample. If the elements are located beyond the nearest polarizing element it will be ineffective because the damage will already have been done.

The design of the optical instrument will determine whether the multiple retardation element can be single or whether separate elements must be used. In flickering beam spectrophotometers, spectrographs such as a Hilger spectrograph, Martens photometer and Koenig-Martens spectrophotometers the beams are so closely adjacent that a single element may be used. In other instruments such as a Duboscq colorimeter the beams may be too far apart and separate elements are necessary. Wherever possible it is desirable to use a single element.

While the elimination of the azimuth effect is generally effected by means of the present invention in any of the types of photometering instruments involving polarization it produces additional results in certain polarized flickering beam spectrophotometers. In a Pineo spectrophotometer using half wave plate flickering, only elimination of azimuth effect results. When, however, Rochon flickering is used an important additional advantage is obtained because the lack of sensitivity in measuring polarizing samples is overcome. In instruments using Rochon flickering, the present invention presents two advantages instead of one and it is a further advantage that the two results are obtained without compensating disadvantages. It is thus possible by means of the present invention to modernize existing equipment at nominal cost as well as to design of new equipment of improved effectiveness. Because of the comparatively high cost of automatic recording spectrophotometers of the flickering beam type, this is an important, economic advantage because it is not necessary to scrap a comparatively large investment in equipment in order to obtain improved performance.

The application of the present invention to spectrophotometers using Rochon flickering introduces no serious mechanical difficulties. It is true that the retardation plate must rotate at the same frequency as the prism in order to maintain constantly the 45° orientation of the optical axis of the plate with respect to the plane of polarization of the light leaving the prism. However, the plate when made of calcite is so light that it can be cemented onto the rear face of the rotating Rochon prism and does not impose any material additional mechanical load on the flicker motor. If it is desired to employ a stationary retardation element two stationary multiple retardation plates may be used at an angle of 45° to each other. They may either be cemented together and mounted as a unit or mounted separably. In any event they perform the function of a single optical element.

It should be noted that the present invention averages out azimuth effects only for spectral bands of finite width. It will not operate with true monochromatic light which corresponds to a spectral band having only a single wave length. This, however, is not a practical disadvantage since many useful spectrophotometers employ a monochromator with an exit slit of finite width. Investigation of the absorption or reflection of light from certain line spectra cannot utilize the advantages of the present invention where the lines are not of finite width. However, such a source of light is never practically used in spectrophotometers of this type.

The invention will be described in greater detail in conjunction with the drawings in which:

Fig. 7 is a diagrammatic view of a spectrophotometer using a Rochon prism as flickering means associated with a stationary retardation element.

Figure 1:
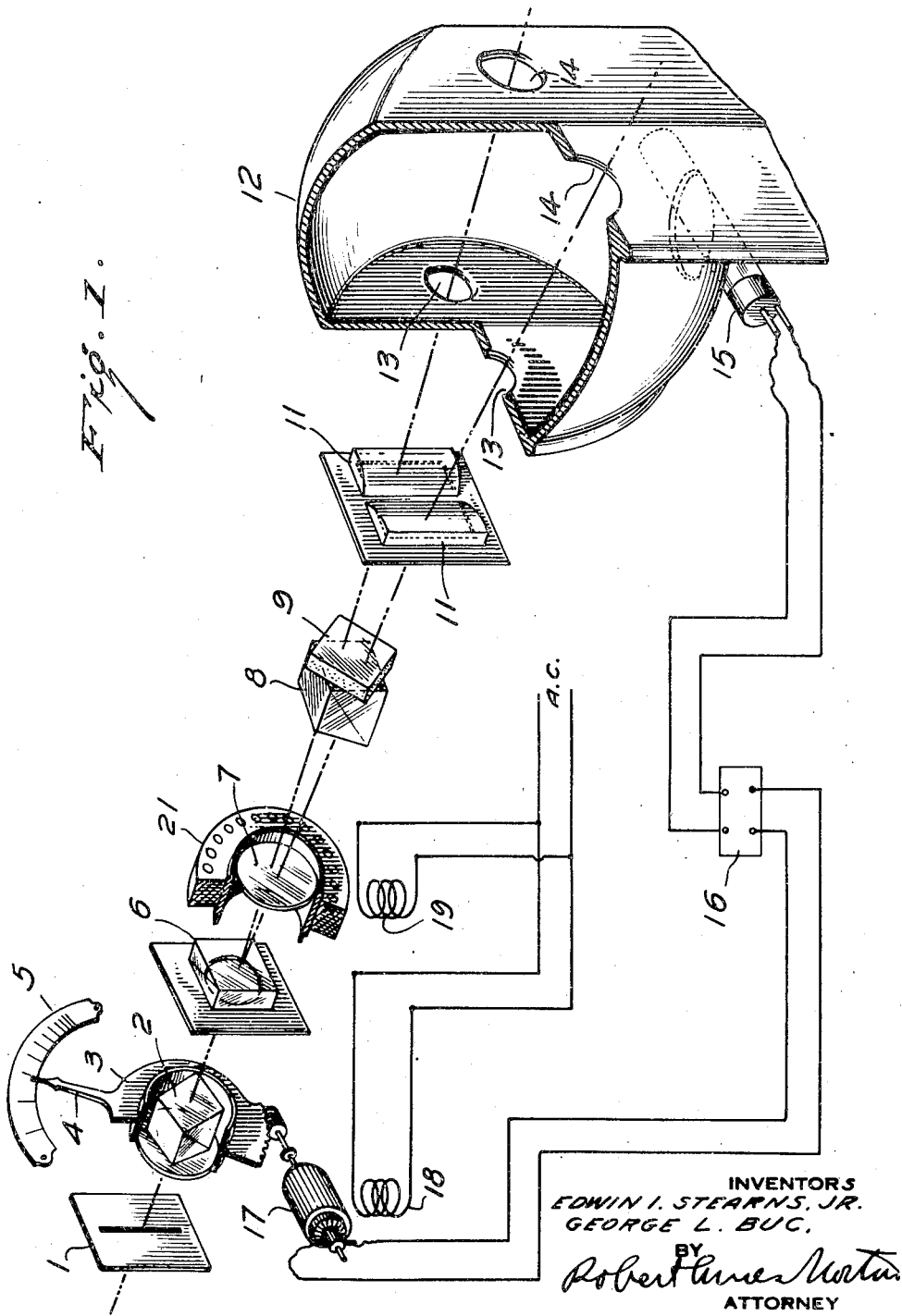
Fig. 1 is a perspective view of a spectrophotometer using a half wave plate flickering means.

In the spectrophotometer shown in Fig. 1, a narrow band of light emerges from the exit slit 1 of the monochromator (not shown) which may be of any conventional design. The beam then passes through a photometering prism 2 carried in a rotatable hollow sleeve 3 which is provided with a pointer 4 moving over a scale 5. The photometering prism, which is preferably a Rochon prism, serves the purpose of transforming the light into plane polarized light which is then passed through a Wollaston prism 6 which splits the beam into two divergent beams plane polarized at right angles to each other. The two beams then pass through a half wave plate 7 which is rotated at one quarter flicker frequency by a synchronous motor 21. The half wave plate causes the planes of polarization of the two beams to rotate at the same rate.

The beams which are flickering in opposite phases then pass through stationary Rochon prism 8 and finally through a plate 9 which may be of calcite cut parallel to the optical axis and sufficiently thick to effect multiple retardation. The thickness can be about two millimeters in the case of calcite in the visual range. The beams pass through the plate 9, which is mounted with the optical axis at 45° to the axis of the Rochon prism retarding the light in both beams so that the spectral band in each beam is transformed into light the individual wave lengths of which are polarized, plane or elliptically in all orientations. The two beams then pass through the conventional decentering lenses 11 and enter the integrating sphere 12 through the windows 13 and may encounter reflectance samples and standards mounted behind the windows 14. The integrated light from any beam is averaged with respect to its states of polarization so that the same average response is obtained with a polarizing sample regardless of azimuth. When the two beams are of equal intensity the integrated light in the sphere does not change but if the reflectance of the sample for a particular narrow wave length band changes, for example, increases, the integrated light will pulsate in phase with the more intense of the two beams. These pulsations are transformed by the phototube 15 into a signal of flicker frequency and are amplified by a high gain audio frequency amplifier 16 and fed to the armature 17 of the motor driving the photometering prism through the suitable gearing 10. The field 18 of the photometering motor and the field 19 of the flicker motor are fed with alternating currents of flicker frequency. The motor 17 responds only to amplified current at flicker frequency and is phased to turn in such a direction that the intensity of the stronger beam in the integrating sphere is decreased and the intensity of the other beam is increased until a state of balance occurs. The degree of rotation of the photometering prism is shown by the movement of the pointer 4 over the scale 5 and is a measure of the amount of unbalance and hence of the reflectance change of the sample at the particular narrow wave length band which in a practical instrument may be of the order of magnitude of 10 millimicrons. The photometering motor may drive a conventional recorder if it is desired to have a recording spectrophotometer instead of an indicator.

Figure 2:
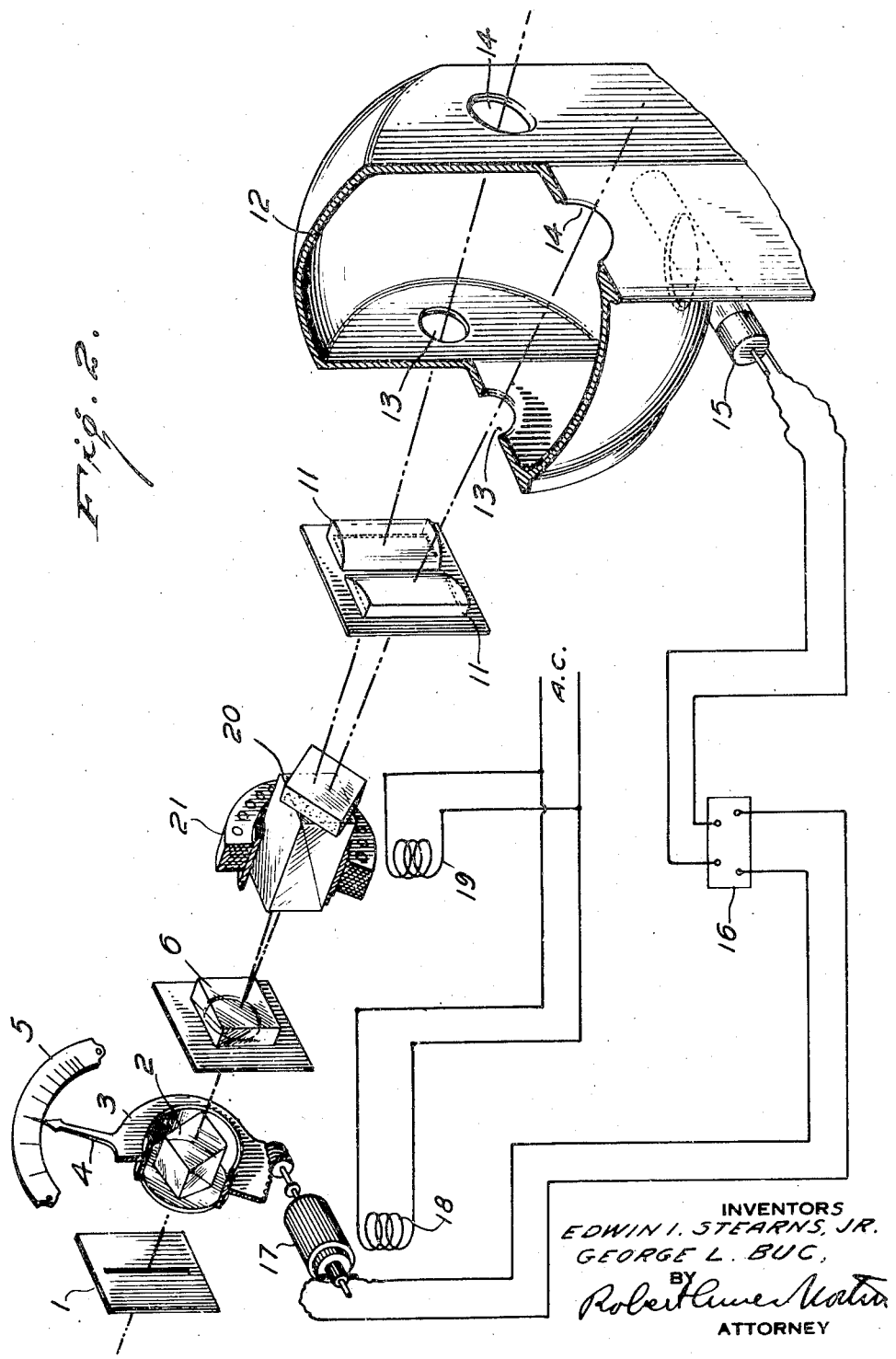
Fig. 2 is a similar perspective view of a spectrophotometer using Rochon prism as flickering means.

Fig. 2 illustrates a spectrophotometer which has the same elements (bearing the same reference numerals) as in Fig. 1 with the difference that the half wave plate 7 and stationary Rochon prism 8 are replaced by a rotating Rochon prism 20 rotated by a motor 21. The multiple retardation plate 9 is mounted on the rotating Rochon prism 20 precisely in the same manner as on the stationary Rochon prism 8 of Fig. 1. It rotates with the prism and performs exactly the same result, each of the beams being split into a series of spectral components having elliptically polarized light of different orientations which average out in azimuth effect.

In Fig. 2 the multiple retardation plate not only performs the function of eliminating azimuth effect which it does in Fig. 1, but it also gives the instrument as high sensitivity with polarizing samples as is possessed by a half wave plate flickering device. Thus in Fig. 2 the multiple retardation plate performs two functions and does not adversely affect the great range which is characteristic of spectrophotometers using Rochon flickering. Therefore, Fig. 2 represents the preferred embodiment.

A multiple retardation plate is a comparatively light and compact optical element and is relatively cheap to make. The multiple rotating device while less compact is also relatively low in cost. It is an important advantage of the present invention that by the addition of either of these relatively cheap elements an existing spectrophotometer can be greatly improved. Particularly a spectrophotometer using Rochon flickering which in many ways is inferior to one using half wave length plate flickering is transformable into a more perfect instrument by the use of the present invention and at a cost which is nominal compared to the cost of a recording spectrophotometer. The present invention is, therefore, applicable to the improvement of existing machines as well as new machines. The advantages of the present invention are, therefore, obtained without any corresponding disadvantages.

Figure 3:
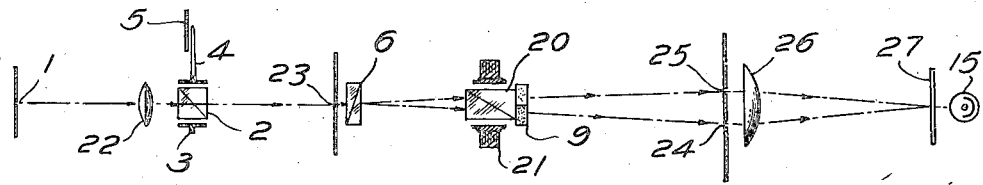
Fig. 3 is a diagrammatic view of flickering beam spectrophotometer using Rochon flickering and a recombination of the two beams instead of an integrating sphere.

Fig. 3 is a diagrammatic view of the optics of a polarized light flickering beam spectrophotometer using combined images instead of an integrating sphere. The same parts bear the same reference numbers. The light issuing from the monochromator exit slit 1 is imaged on a slit 23 by the lens 22, the beam passing through a photometering Rochon prism 2 mounted in a rotable sleeve 3 and carrying a pointer 4 which moves over a scale 5. After leaving the slit 23 the beam passes through a Wollaston prism 6 which splits it into two divergent beams plane polarized at right angles to each other. The beams then pass through a Rochon flickering prism 20 rotated by the motor 21. On the rear face of the flicker prism there is cemented a multiple retardation plate 9 with its axis at 45° to that of the flickering prism. The operation of the mechanism is the same as in Fig. 2, each beam being subjected to multiple retardation at different wave lengths and then passing through sample and standard windows 24 and 25. The beams are then focused by the lens 26 onto the plane of a ground glass screen 27. The diffused light of the combined images illuminates the phototube 15, the output of which can be amplified and effect photometering in the conventional manner as is shown in Figs. 1 and 2.

The operation of the spectrophotometer is the same as that shown in Figs. 1 and 2 except that it is suitable only for transmission samples. The correction of the azimuth effect and improved sensitivity of the Rochon flickering with polarizing samples are the same as in Fig. 2.

Figure 4:
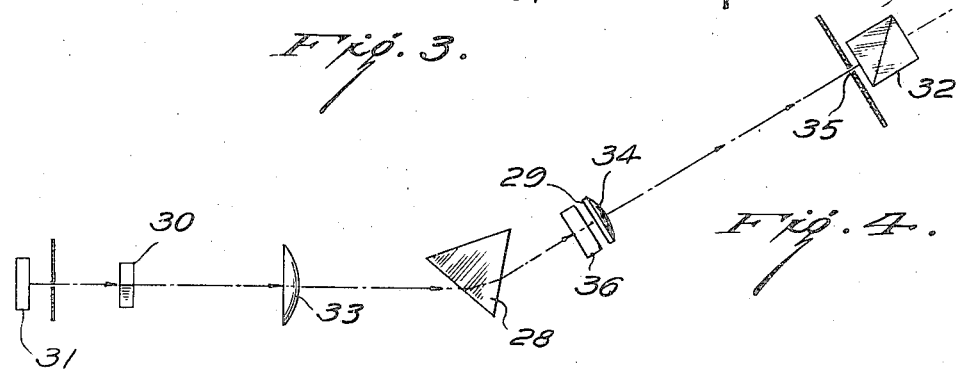
Fig. 4 is a diagrammatic elevation of a Koenig-Martens spectrophotometer using a multiple retardation plate.

Fig. 4 illustrates a split field type of spectrophotometer, namely, a Koenig-Martens spectrophotometer in which light from a sample and standard is monochromated and photometered. The view is a horizontal elevation and shows the beam from one of the two samples 31 one of which may act as a standard. The beam then passes through a multiple retardation plate 30 and is collimated by the lens 33 and passes through a rotatable dispersing prism 28. The spectra from the two beams then pass through a Wollaston prism 36, the axis of which is at right angles to the plane of the figure, and finally through a biprism 29 and lens 34 which images the spectra on a slit 35. The narrow band of light from the slit then passes through a photometering polarizer 32 which can be turned to make the two fields from sample and standard beams equal in brightness. The figure is a diagram of the optics only, the photometering Rochon prism is naturally mounted in the conventional manner.

Non-uniform response from polarizing samples and standards at different azimuths is completely averaged by the multiple retardation plate which is the only added element in the Koenig-Martens spectrophotometer. The usefulness of the instrument is therefore extended to polarizing samples by an addition of a cheap optical element which does not require reconstruction of the instrument.

Figure 5:
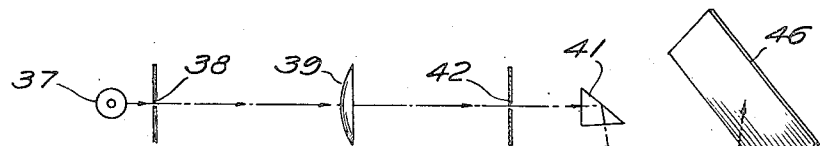
Fig. 5 is a perspective diagram of a Hilger spectrograph using a multiple retardation plate.

Fig. 5 is a diagram, partly in perspective, of a Hilger spectrograph. Light from a source 37, which may be, for example, ultra violet light, passes through the slit 38 collimating lens 39 and sample 42 onto the totally reflecting prism 41 inside the body of the spectrograph. The beam then passes through a multiple retardation plate 40 and thence through the conventional lens 44, dispersing prism 45 with reflecting back, and then through the lens 44 onto the photographic plate holder 46. The diagram is that of a conventional spectrograph except for the element 40. Non-uniform responses from polarizing samples at different azimuths are completely averaged over the spectrum by the multiple retardation plate 40. This element may be included in a conventional Hilger spectrograph without any reconstruction and it extends the usefulness of the optical device to the accurate measurement of polarizing samples regardless of the azimuth of the sample.

Figure 6:
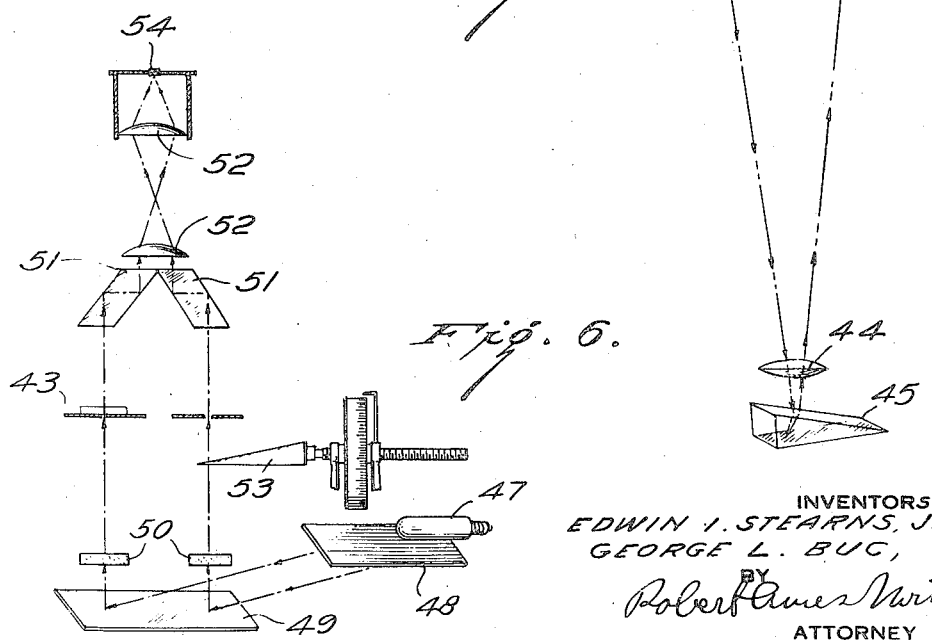
Fig. 6 is a perspective diagram of a Duboscq colorimeter using a pair of multiple retardation plates.

Fig. 6 is a diagram, partly in perspective, of a Duboscq colorimeter equipped for measuring solid samples and provided with a pair of multiple retardation plates. A source of light 47 illuminates a diffusing screen 48 and the diffused light is reflected by a mirror 49 up through the instrument which includes a sample holder 43, and photometering neutral wedge 53. The light beams also pass through the conventional double reflecting prism 51, lenses 52 and ocular 54. The only change in the instrument is the provision of multiple retardation plates 50 in each of the two beams. Non-uniform response with polarizing samples to the varying degrees of polarization introduced by the mirror 49 is completely eliminated and the colorimeter may be used with polarizing samples with the same accuracy as with other samples.

Fig. 7 is a diagram of a flickering beam spectrophotometer using Rochon flickering similar to that shown in Fig. 2, the same parts bearing the same reference numerals. Instead of a single multiple retardation plate affixed to the flicker prism 20, two stationary multiple retardation plates 55 and 56 are interposed between the flicker prism and the decentering lenses 11. These multiple retardation plates, which may be of the same type as the single plate in Fig. 2, are oriented with their axes at 45° to each other.

As the flicker prism rotates the planes of polarization of the two emergent beams also rotate. When these planes are at 45° to the first retardation plate 55 of the pair, this plate performs the same function as it does in Fig. 2, and the other plate does not retard. Similarly, when the flicker prism has rotated so that the plane of polarization is at 45° to the second retardation plate 56, this latter plate performs the entire retardation function. At intermediate orientations part of the retardation is effected by one of the plates and part by the other. The net effect on an illuminated sample is precisely the same as in the device of Fig. 2, that is to say, the wave lengths over a finite band of light are retarded to different degrees so that the major axis of polarization for the different wave lengths is rotated to produce orientations of polarization symmetrically distributed.

In Fig. 7 the two stationary retardation plates are shown cemented together. This is a convenient form in which to mount the plates in an instrument. Optically the element formed by the two plates performs the same function if the plates are separated but mounted so as to maintain the 45° orientation of their axes with respect to each other.

The advantages of the invention are not limited to instruments operating on light in the visible spectrum although these instruments represent the largest field of photometric apparatus. Eliminaton of the azmuth effect by means of the present invention is just as important with machines using ultra violet light or infrared so long as the light still becomes polarized. For this reason the term "light" will be used in broader sense to include ultra violta and infrared. Similarly where reference is made to illumination it is not intended to limit the term to light in the visible spectrum.

When infrared or ultra violet light is used suitable sources must be employed and also suitable receptors. In the former case for the near infrared they may be phototubes as shown in Figs. 1 to 3. Fig. 5 requires only the use of optics of a suitable material and appropriately sensitized film for use in the infrared. In general, a Hilger spectrograph with quartz optics may be used for most measurements in the ultra violet and the near infrared.

Visual observation which is employed in the case of instruments shown in Figs. 4 and 6 must be replaced by photographic observation for the infrared or either photographic or fluorescent screen observation for the ultra violet.

This application is in part a continuation of our copending, now abandoned, application Serial No. 538,307, filed June 1, 1944.

We claim:

1. In a photometric apparatus including means for illuminating a sample with a spectrally narrow band of light and photometering means, an element of the apparatus polarizing light to a material extent sufficient to give different responses from a polarizing sample at various orientations, the improvement which comprises a multiple retardation plate intermediate the sample and the polarizing element of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

2. In a comparison photometric apparatus including means for illuminating a sample and a comparison standard with a spectrally narrow band of light, photometering means and means for directing light from both sample and standard to the photometering means, an element of the apparatus polarizing light to a material extent sufficient to give different responses from a polarizing sample at various orientations, the improvement which comprises a multiple retardation plate intermediate the sample and the polarizing element of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

3. In a photometric apparatus comprising a photoelectric device arranged to receive integrated light from a sample and a standard, an optical system arranged to control the light received by said device comprising in series means for emitting a spectrally narrow band of light, an angularly movable polarizing member, a second member having the property of dividing a light beam into two divergent beams which are polarized respectively in planes at right angles to each other, and a third member between the second member and the sample and standard capable of causing each beam to flicker from a minimum to a maximum, the flickering of the two beams being in opposite phase, and means by which the polarizing member may be angularly adjusted in accordance with the output of the photoelectric device, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

4. In a photometric apparatus comprising a photoelectric device arranged to receive integrated light from a sample and a standard, an optical system arranged to control the light received by said device comprising in series means for emitting a spectrally narrow band of light, an angularly movable polarizing member, a second member having the property of dividing a light beam into two divergent beams which are polarized respectively in planes at right angles to each other, a uniformly rotatable third member between the second member and the sample and standard capable of causing each beam to flicker by varying from a minimum to a maximum, the variation being in opposite phase, electric driving means for the angularly movable polarizing member responsive to alternating current of a predetermined frequency, means for uniformly rotating the beam flickering member at such a speed as to cause the beams to flicker at the same frequency to which the driving means of the angularly movable polarizing member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the angularly movable polarizing member, the phase of the flicker frequency of the amplifier output and electric driving means being so adjusted as to cause the polarizing member to rotate in a direction to produce the same total light from the sample and standard, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

5. In a photometric apparatus comprising a photoelectric device arranged to receive integrated light from a sample and a standard, an optical system arranged to control the light received by said device comprising in series an angularly movable polarizing member, a second member having the property of dividing a light beam into two divergent beams which are polarized respectively in planes at right angles to each other, and a third member between the second member and the sample and standard capable of causing each beam to flicker from a minimum to a maximum, the flickering of the two beams being in opposite phase, means by which the angularly movable polarizing member may be adjusted in accordance with the output of the photoelectric device, means for passing to the angularly movable polarizing member a beam of a narrow band of substantially monochromatic light of finite wave length range, said means being further capable of varying the wave length of said monochromatic light from one end of the spectrum to the other, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

6. In a photometric apparatus comprising a photoelectric device arranged to receive integrated light from a sample and a standard, an optical system arranged to control the light received by said device comprising in series an angularly movable polarizing member, a second member having the property of dividing a light beam into two divergent beams which are polarized respectively in planes at right angles to each other, a uniformly rotatable third member between the second member and the sample and standard capable of causing each beam to flicker by varying from a minimum to a maximum, the variation being in opposite phase, electric driving means for the first member responsive to alternating current of a predetermined frequency, means for uniformly rotating the beam flickering member at such a speed as to cause the beams to flicker at the same frequency to which the driving means at the first member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the first polarizing member, the phase of the flicker frequency of the amplifier output and electric driving means being so adjusted as to cause the polarizing member to rotate in a direction to produce the same total light from the sample and standard and means for passing to the first polarizing member a beam of a narrow band of substantially monochromatic light of finite wave length range, said means being further capable of varying the wave length of said monochromatic light from one end of the spectrum to the other, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

7. In a photometric apparatus having a flicker mechanism including in optical alignment the following elements, a source of light capable of emitting a spectrally narrow band of light, polarizing means capable of producing two divergent beams polarized at right angles to each other, means for rotating the planes of polarization of the beams at predetermined frequency in opposite phases, a fixed polarizing element through which the rotating polarized beams pass before encountering the materials to be measured, and an adjustable photometering element, the adjustment of which varies the relative intensities of the two polarized beams, one beam illuminating a standard and the other a sample, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

8. In a photometric apparatus containing a flicker mechanism for varying in opposite phase the intensity of two beams, comprising in optical alignment a source of light capable of emitting a one spectrally band of light, an adjustable photometering polarizer, means for splitting the light into two divergent beams polarized at right angles to each other, means for varying the states of polarization of said beams in opposite phases without substantial variation of the intensities of said beams, a fixed polarizing member through which the beams pass, said polarizing member producing two emergent beams which are non-varying in their states of polarization in the sense that the two ellipses symbolizing the states of polarization of the two beams are non-varying in eccentricity and in orientation but which fixed polarizing member causes the intensity of the non-varying polarized emergent beams to vary in opposite phases at flicker frequency, one beam illuminating a standard and the other a sample, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

9. In a photometric apparatus containing a flicker mechanism for varying in opposite phases the intensity of two beams comprising in optical alignment a source of light capable of emitting a spectrally narrow band of light, an adjustable photometering polarizer, means for splitting the light into two divergent beams polarized at right angles to each other, a rotatable retardation plate capable of varying the states of polarization in said beams in opposite phases without substantial variation of the intensity of said beams, a fixed polarizing member through which the beams pass, said polarizing member producing two emergent beams which are non-varying in their state of polarization in the sense that the two ellipses symbolizing the states of polarization of the two beams are non-varying in eccentricity and in orientation, but which fixed polarizing member causes the intensity of the non-varying polarized emergent beams to vary in opposite phase at flicker frequency, one beam illuminating a standard and the other a sample, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

10. In a photometric apparatus containing a flickering mechanism for varying in opposite phase the intensity of two beams comprising in optical alignment a source of light and an adjustable photometering polarizer, means for splitting the light into two divergent beams polarized at right angles to each other, a rotating polarizer capable of varying the intensity of the polarized emergent beams in opposite phases at flicker frequency, one beam illuminating a standard and the other a sample, the improvement which comprises a multiple retardation plate intermediate the flickering means and sample and standard of birefringent material with faces cut parallel to the optical axis, of such thickness that the light path through the retardation plate is sufficiently long so that at least five complete retardation cycles are effected for the wave lengths of each 10 millimicron band throughout the visible spectrum whereby the response from polarizing samples is substantially invariant with the azimuth of the sample.

11. A photometric apparatus according to claim 1 in which the retardation plate comprises a pair of multiple retardation plates with their axes orientated at about 45° to each other.

12. A photometric apparatus according to claim 2 in which the retardation plate comprises a pair of multiple retardation plates with their axes orientated at about 45° to each other.

13. A photometric apparatus according to claim 3 in which the retardation plate comprises a pair of multiple retardation plates with their axes orientated at about 45° to each other.

14. A photometric apparatus according to claim 4 in which the retardation plate comprises a pair of multiple retardation plates with their axes orientated at about 45° to each other.

15. A photometric apparatus according to claim 5 in which the retardation plate comprises a pair of multiple retardation plates with their axes orientated at about 45° to each other.

16. A photometric apparatus according to claim 6 in which the retardation plate comprises a pair of multiple retardation plates with their axes orientated at about 45° to each other.

17. A photometric apparatus according to claim 7 in which the retardation plate comprises a pair of multiple retardation plates with their axes orientated at about 45° to each other.

18. A photometric apparatus according to claim 8 in which the retardation plate comprises a pair of multiple retardation plates with their axes orientated at about 45° to each other.

19. A photometric apparatus according to claim 9 in which the retardation plate comprises a pair of multiple retardation plates with their axes orientated at about 45° to each other.

20. A photometric apparatus according to claim 10 in which the retardation plate comprises a pair of multiple retardation plates with their axes orientated at about 45° to each other.

EDWIN I. STEARNS, Jr.
GEORGE L. BUC.

REFERENCES CITED

The following references are of record in the file of this patent:

UNITED STATES PATENTS

| Number | Name | Date |
|---|---|---|
| 2,189,270 | Pineo | Feb. 6, 1940 |

FOREIGN PATENTS

| Number | Country | Date |
|---|---|---|
| 587,850 | Germany | Nov. 9, 1933 |

OTHER REFERENCES

Physical Optics, by Robert Wood, published by the The MacMillan Co. in 1905, pages 378–381 and 384 cited.